(12) United States Patent
Filter

(10) Patent No.: US 9,297,333 B2
(45) Date of Patent: Mar. 29, 2016

(54) VARIABLE GEOMETRY INLET FOR A DUCTED FAN AND METHOD OF ASSEMBLING SAME

(71) Applicant: The Boeing Company

(72) Inventor: Evan J. Filter, Doylestown, PA (US)

(73) Assignee: The Boeing Company, Chicago, IL (US)

( * ) Notice: Subject to any disclaimer, the term of this patent is extended or adjusted under 35 U.S.C. 154(b) by 65 days.

(21) Appl. No.: 14/468,406

(22) Filed: Aug. 26, 2014

(65) Prior Publication Data

US 2016/0061144 A1   Mar. 3, 2016

(51) Int. Cl.

| | |
|---|---|
| *F02C 7/04* | (2006.01) |
| *B64D 33/02* | (2006.01) |
| *F02K 1/06* | (2006.01) |
| *F01D 25/24* | (2006.01) |
| *F01D 25/00* | (2006.01) |
| *F02C 7/042* | (2006.01) |

(52) U.S. Cl.
CPC . *F02K 1/06* (2013.01); *B64D 33/02* (2013.01); *F01D 25/005* (2013.01); *F01D 25/24* (2013.01); *F02C 7/042* (2013.01); *B64D 2033/0286* (2013.01)

(58) Field of Classification Search
CPC .......... B64D 33/02; B64D 2033/0226; B64D 2033/0286; F02K 1/085; F02K 1/08; F02K 1/10; F02K 1/645; F02C 7/042; F02C 7/04; F02C 7/057
See application file for complete search history.

(56) References Cited

U.S. PATENT DOCUMENTS

| | | | | |
|---|---|---|---|---|
| 2,934,288 A | * | 4/1960 | MacIntyre | F02C 7/042 244/134 R |
| 2,948,111 A | * | 8/1960 | Nelson | F02C 7/042 244/34 A |
| 2,960,281 A | * | 11/1960 | Jumelle | F02C 7/042 244/53 B |
| 3,074,232 A | * | 1/1963 | Soyer | F02C 7/042 244/53 B |
| 3,119,581 A | * | 1/1964 | Trevaskis | F02C 7/042 244/53 B |
| 3,279,192 A | | 10/1966 | Hull, Jr. et al. | |
| 3,285,003 A | * | 11/1966 | Martin | F02C 7/042 244/53 B |
| 3,347,496 A | | 10/1967 | Opfer, Jr. | |
| 3,494,380 A | * | 2/1970 | Martin | F02C 7/042 244/53 B |
| 3,524,611 A | * | 8/1970 | Frank | B64C 29/0033 244/53 B |
| 4,155,221 A | | 5/1979 | Dhoore et al. | |
| 4,156,475 A | * | 5/1979 | Chaplin | B60V 1/14 244/12.5 |
| 8,276,364 B2 | | 10/2012 | Levasseur | |
| 2011/0147533 A1 | | 6/2011 | Goossen et al. | |

* cited by examiner

FOREIGN PATENT DOCUMENTS

FR          1526523 A   *   5/1968   ............ F02C 7/042

*Primary Examiner* — Tien Dinh
*Assistant Examiner* — Richard R Green
(74) *Attorney, Agent, or Firm* — Armstrong Teasdale LLP

(57) ABSTRACT

A variable geometry inlet for a ducted fan is selectively transitionable between a first and second mode. The inlet includes a retractable ring that extends circumferentially about the inlet and is selectively movable between an axially extended position in the first mode and an axially retracted position in the second mode. A tube extends circumferentially proximate the retractable ring, and is pressurizable to a relatively deflated state in the first mode and to a relatively inflated state in the second mode. A stretchable skin extends circumferentially proximate the retractable ring, and is elastically deformable in at least a circumferential direction about a longitudinal axis of the fan. A leading edge of the inlet in the first mode is defined by the stretchable skin disposed against a forward edge of the retractable ring, and in the second mode by the stretchable skin disposed against at least a portion of the tube.

20 Claims, 5 Drawing Sheets

VARIABLE GEOMETRY INLET FOR A DUCTED FAN AND METHOD OF ASSEMBLING SAME

STATEMENT REGARDING FEDERALLY SPONSORED RESEARCH & DEVELOPMENT

This invention was made with Government support under contract number HR0011-14-9-0002 awarded by the Defense Advanced Research Projects Agency. The government has certain rights in this invention.

BACKGROUND

The field of the disclosure relates generally to ducted fans, and, more particularly, to a ducted fan that includes an inlet with a variable geometry.

At least some known aircraft have engines that include ducted fans. At least some known ducted fans include an inlet with a fixed geometry. For example, the inlet geometry is selected to facilitate enhanced performance for an expected operational mode of the ducted fan. However, at least some known aircraft, such as some known vertical takeoff and landing ("VTOL") aircraft, include at least two distinct operational modes, such as a hover mode and a high-speed cruise mode, that have conflicting inlet geometry performance requirements. As a result, selecting a fixed inlet geometry that facilitates enhanced performance in each mode is difficult.

At least some known ducted fans are provided with a variable geometry inlet. The geometry is designed to vary between a first geometry, which facilitates enhanced performance in a first operational mode of the fan, and a second geometry, which facilitates enhanced performance in a second operational mode of the fan. However, a mechanical and/or control complexity of at least some known variable geometry inlets limits a reliability, cost effectiveness, and performance of such known variable geometry ducted fans.

BRIEF DESCRIPTION

In one aspect, a variable geometry inlet for a ducted fan is provided. The variable geometry inlet is selectively transitionable between a first mode and a second mode. The variable geometry inlet includes a retractable ring that extends circumferentially about the variable geometry inlet. The retractable ring is selectively movable between an axially extended position in the first mode and an axially retracted position in the second mode. The variable geometry inlet also includes a tube that extends circumferentially proximate the retractable ring. The tube is pressurizable to a relatively deflated state in the first mode and to a relatively inflated state in the second mode. The variable geometry inlet further includes a stretchable skin that extends circumferentially proximate the retractable ring. The stretchable skin is elastically deformable in at least a circumferential direction about a longitudinal axis of the ducted fan. A leading edge of the variable geometry inlet in the first mode is defined by the stretchable skin disposed against a forward edge of the retractable ring, and the leading edge in the second mode is defined by the stretchable skin disposed against at least a portion of the tube.

In another aspect, a ducted fan is provided. The ducted fan includes a generally annular body and a variable geometry inlet coupled to the body. The variable geometry inlet is selectively transitionable between a first mode and a second mode. The variable geometry inlet includes a retractable ring that extends circumferentially about the variable geometry inlet. The retractable ring is selectively movable between an axially extended position in the first mode and an axially retracted position in the second mode. The variable geometry inlet also includes a tube that extends circumferentially proximate the retractable ring. The tube is pressurizable to a relatively deflated state in the first mode and to a relatively inflated state in the second mode. The variable geometry inlet further includes a stretchable skin that extends circumferentially proximate the retractable ring. The stretchable skin is elastically deformable in at least a circumferential direction about a longitudinal axis of the ducted fan. A leading edge of the variable geometry inlet in the first mode is defined by the stretchable skin disposed against a forward edge of the retractable ring, and the leading edge in the second mode is defined by the stretchable skin disposed against at least a portion of the tube.

In another aspect, a method of assembling a ducted fan having a variable geometry inlet is provided. The variable geometry inlet is selectively transitionable between a first mode and a second mode. The method includes coupling a retractable ring to a body of the ducted fan. The retractable ring extends circumferentially about the variable geometry inlet and is selectively movable between an axially extended position in the first mode and an axially retracted position in the second mode. The method also includes positioning a tube to extend circumferentially proximate the retractable ring. The tube is pressurizable to a relatively deflated state in the first mode and to a relatively inflated state in the second mode. The method further includes coupling a stretchable skin to the body. The stretchable skin extends circumferentially proximate the retractable ring and is elastically deformable in at least a circumferential direction about a longitudinal axis of the ducted fan, such that a leading edge of the variable geometry inlet in the first mode is defined by the stretchable skin disposed against a forward edge of the retractable ring, and the leading edge in the second mode is defined by the stretchable skin disposed against at least a portion of the tube.

The features, functions, and advantages that have been discussed can be achieved independently in various embodiments or may be combined in yet other embodiments further details of which can be seen with reference to the following description and drawings.

DETAILED DESCRIPTION

Embodiments of the system and method described herein provide a variable geometry inlet for a ducted fan, such as a ducted fan for a VTOL aircraft. The variable geometry inlet enables improved performance of the ducted fan in each of at least two operational modes. The inlet includes a stretchable skin. In a first of the at least two operational modes, the stretchable skin is disposed against a forward edge of an axially extendable ring to define a leading edge of the variable geometry inlet. In a second of the at least two operational modes, the stretchable skin is disposed against at least a portion of a pressurizable tube to define the leading edge of the variable geometry inlet.

Figure 1:
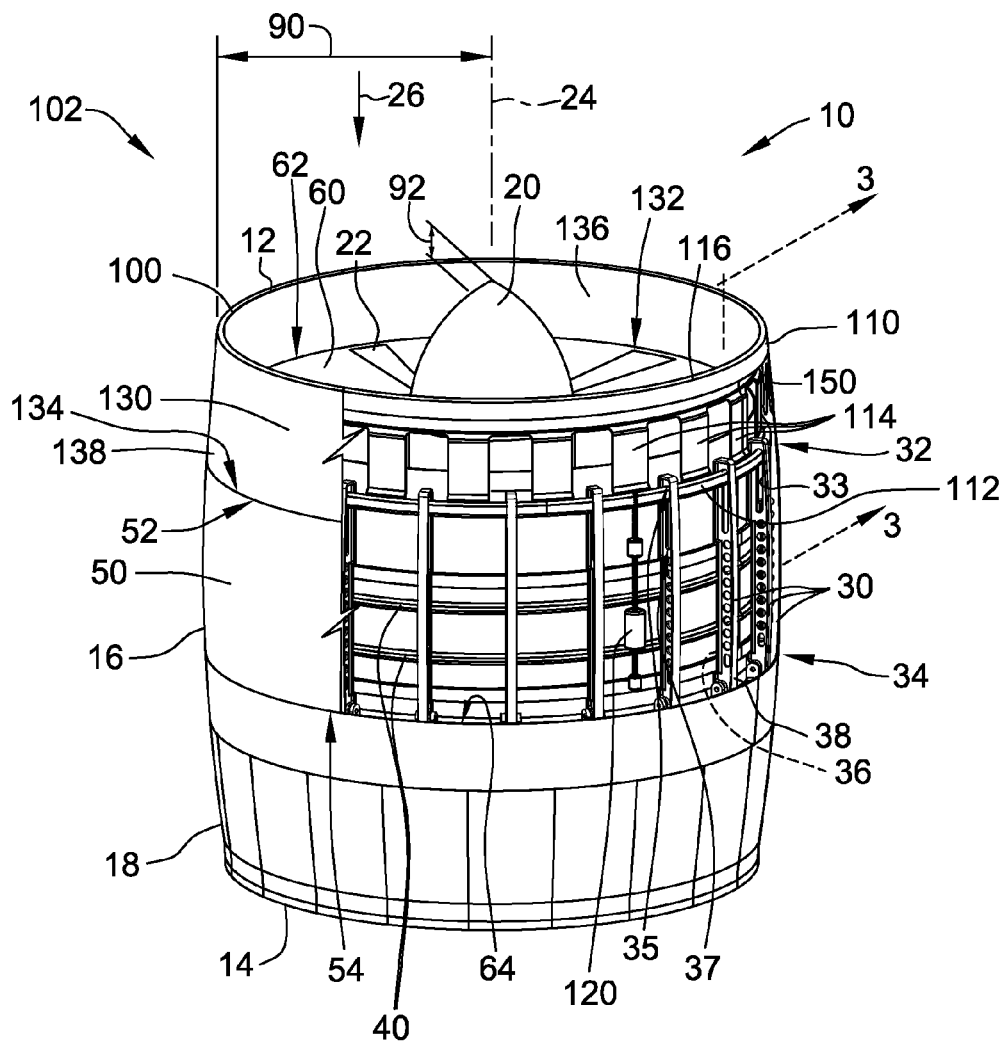
FIG. 1 is a schematic cutaway view of an exemplary ducted fan with an exemplary variable geometry inlet in a first operational mode.
Figure 3:
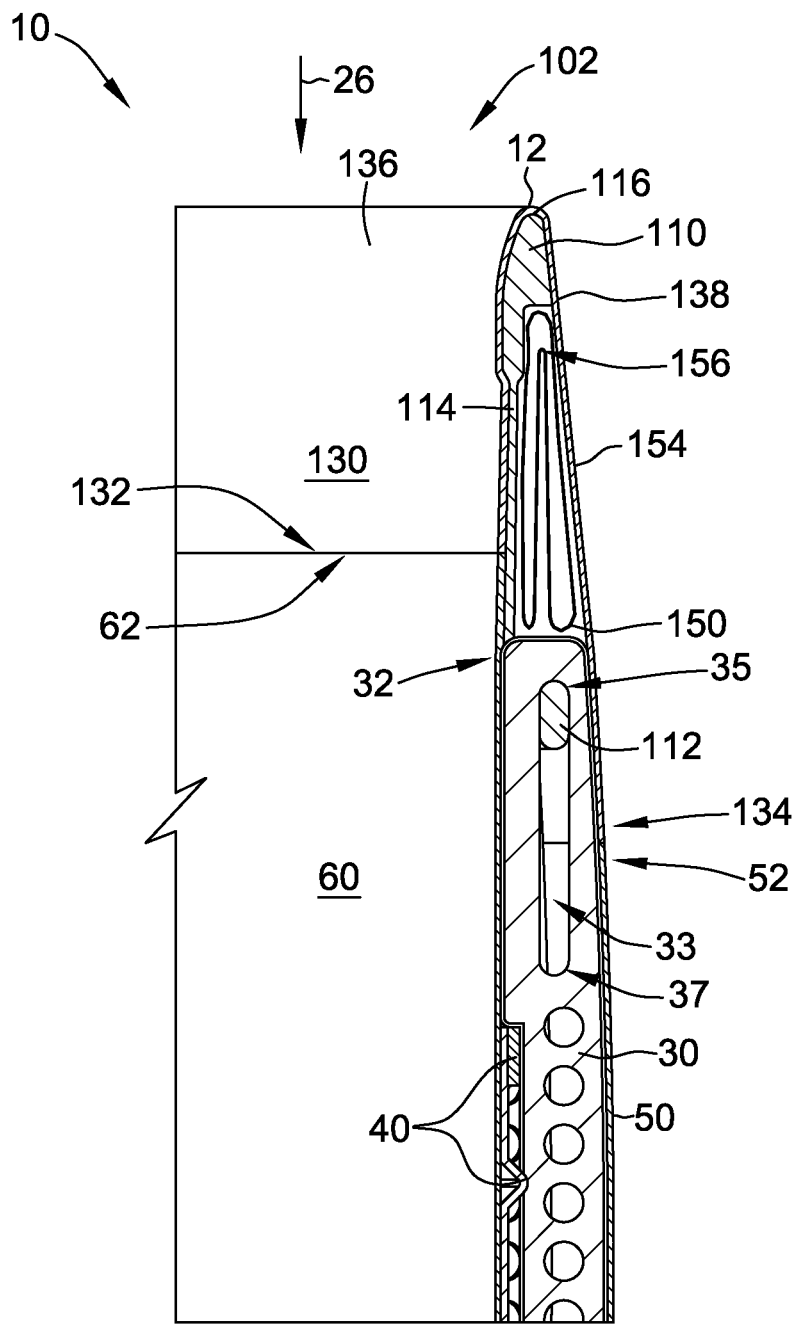
FIG. 3 is a schematic cross-sectional view of a portion of the exemplary ducted fan shown in FIG. 1 with the exemplary variable geometry inlet shown in FIG. 1 in the first operational mode, taken along line 3-3 shown in FIG. 1.
Figure 4:
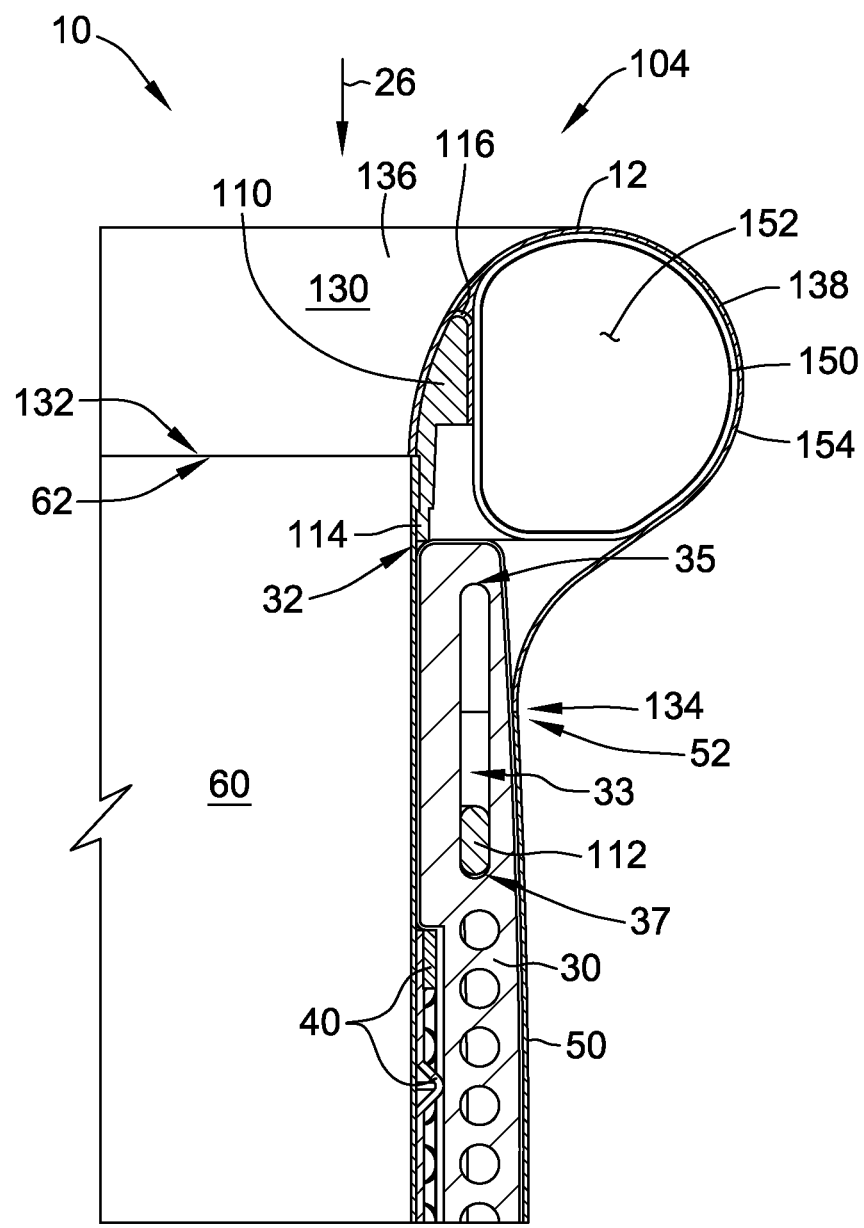
FIG. 4 is a schematic cross-sectional view of a portion of the exemplary ducted fan shown in FIG. 2 with the exemplary variable geometry inlet shown in FIG. 2 in the second operational mode, taken along line 4-4 shown in FIG. 2.

Referring more particularly to the drawings, implementations of the disclosure may be described in the context of a ducted fan 10. Ducted fan 10 is shown schematically in cutaway view with a variable geometry inlet 100 in a first operational mode 102 in FIG. 1, and schematically in cutaway view with variable geometry inlet 100 in a second operational mode 104 in FIG. 2. FIG. 3 is a schematic cross-sectional view of a portion of ducted fan 10 with variable geometry inlet 100 in first mode 102, taken along line 3-3 shown in FIG. 1. FIG. 4 is a schematic cross-sectional view of a portion of ducted fan 10 with variable geometry inlet 100 in second mode 104, taken along line 4-4 shown in FIG. 2. Variable geometry inlet 100 is selectively transitionable between first mode 102 and second mode 104.

Referring to FIGS. 1-4, ducted fan 10 extends axially from a leading edge 12 to a trailing edge 14. Ducted fan 10 includes a generally annular body 16, an outlet 18 proximate trailing edge 14, and a variable geometry inlet 100 coupled to body 16 opposite outlet 18. Ducted fan 10 further includes a center body 20, and at least one rotor 22 coupled to center body 20. The at least one rotor 22 is rotatable about a longitudinal axis 24 to draw air into variable geometry inlet 100, accelerate the air through an interior of body 16 in a downstream direction 26, and exhaust the air through outlet 18. For example, the at least one rotor 22 is rotatable by an engine or transmission (not shown) coupled to center body 20. In certain embodiments, ducted fan 10 is operable to propel an aircraft (not shown), such as a VTOL aircraft, in flight. For example, first mode 102 is a cruise mode in which fan longitudinal axis 24 is oriented substantially parallel to a nose-tail axis of the aircraft, and second mode 104 is a hover mode in which fan longitudinal axis 24 is oriented substantially perpendicular to the nose-tail axis of the aircraft. It should be understood, however, that the disclosure applies equally to ducted fans used in other applications.

In the illustrated embodiment, body 16 includes a plurality of circumferentially spaced stringers 30. Each stringer 30 extends substantially axially between a first end 32, proximate variable geometry inlet 100, and a second end 34, proximate outlet 18. A slot 33 is defined in each stringer 30 proximate first end 32. Each slot 33 extends substantially axially within the corresponding stringer 30 from a first end 35 to a second end 37. Each stringer 30 also extends substantially radially between a radially inner side 36 and a radially outer side 38. Body 16 also includes a plurality of axially spaced ribs 40 that each extend generally circumferentially about body 16. Each rib 40 is coupled to plurality of stringers 30. In alternative embodiments, plurality of stringers 30 is coupled to body 16 in any suitable fashion that enables ducted fan 10 to function as described herein.

Body 16 also includes a substantially rigid outer body skin 50 coupled to at least one of plurality of ribs 40 and radially outer sides 38 of plurality of stringers 30. Outer body skin 50 extends generally circumferentially and defines a radially outer surface of body 16. Outer body skin 50 also extends axially between a first edge 52, proximate variable geometry inlet 100, and a second edge 54, proximate outlet 18. In an embodiment, outer body skin 50 is formed from a carbon fiber reinforced polymer material. In alternative embodiment, outer body skin 50 is formed from a metallic material, such as aluminum. In another alternative embodiment, outer body skin 50 is formed from any other suitable material that enables ducted fan 10 to function as described herein.

Additionally, body 16 includes a substantially rigid inner body skin 60 coupled to at least one of plurality of ribs 40 and radially inner side 36 of plurality of stringers 30. Inner body skin 60 extends generally circumferentially and defines a radially inner surface of body 16. Inner body skin 60 also extends axially between a first edge 62, proximate variable geometry inlet 100, and a second edge 64, proximate outlet 18. In an embodiment, inner body skin 60 is formed from a carbon fiber reinforced polymer material. In alternative embodiment, inner body skin 60 is formed from a metallic material, such as aluminum. In another alternative embodiment, inner body skin 60 is formed from any other suitable material that enables ducted fan 10 to function as described herein.

Variable geometry inlet 100 extends axially between body 16 and leading edge 12, and extends generally circumferentially about ducted fan 10 proximate leading edge 12. Variable geometry inlet 100 includes a retractable ring 110 that extends circumferentially about variable geometry inlet 100. A substantially circular forward edge 116 of retractable ring 110 is defined as the locus of upstream-most points on retractable ring 110. Retractable ring 110 is selectively movable between an axially extended position in first mode 102 (shown in FIG. 1) and an axially retracted position in second mode 104 (shown in FIG. 2). More specifically, forward edge 116 in first mode 102 is farther upstream than forward edge 116 in second mode 104.

Variable geometry inlet 100 also includes at least one actuator 120 that is operable to selectively axially extend and retract retractable ring 110. For example, in the illustrated embodiment, variable geometry inlet 100 includes a track ring 112 that is configured to be received in each of plurality of slots 33 of stringers 30, and a plurality of circumferentially spaced struts 114 that each extend axially between retractable ring 110 and track ring 112. The at least one actuator 120 is a linear actuator coupled to track ring 112, and is operable to move track ring 112 axially between first end 35 and second end 37 of each slots 33.

In the illustrated embodiment, the at least one actuator 120 includes three actuators 120 (only one of which is visible in the cutaway views of FIGS. 1 and 2) that are spaced circumferentially at 120-degree intervals around body 16. In alternative embodiments, the at least one actuator 120 includes any suitable number and type of actuators 120 at any suitable locations that enable variable geometry inlet 100 to function as described herein. In an embodiment, each actuator 120 is an electric actuator. In another embodiment, at least one actuator 120 is a pneumatic actuator. In another embodiment, at least one actuator 120 is a hydraulic actuator. In alternative embodiments, each at least one actuator 120 is any suitable actuator that enables variable geometry inlet 100 to function as described herein.

Variable geometry inlet 100 also includes a stretchable skin 130 that extends circumferentially about variable geometry inlet 100 proximate retractable ring 110. Stretchable skin 130 is formed from a material that is elastically deformable in at least a circumferential direction about longitudinal axis 24. Additionally, stretchable skin 130 extends axially upstream (that is, opposite to downstream direction 26) from a first edge 132, proximate first edge 62 of inner body skin 60, to leading edge 12 to define a radially inner surface 136 of variable geometry inlet 100. Moreover, stretchable skin 130 extends axially downstream (that is, in downstream direction 26) from leading edge 12 to a second edge 134 proximate first edge 52 of outer body skin 50 to define a radially outer surface 138 of variable geometry inlet 100. In certain embodiments, stretchable skin 130 is coupled to body 16. For example, first edge 132 is coupled to at least one of inner body skin first edge 62, plurality of ribs 40, and radially inner side 36 of plurality of stringers 30, and second edge 134 is coupled to at least one of outer body skin first edge 52, plurality of ribs 40, and radially outer sides 38 of plurality of stringers 30.

Variable geometry inlet 100 further includes a substantially annular tube 150. An inner wall of tube 150 defines an interior chamber 152, and chamber 152 is selectively pressurizable between a first pressure and a second pressure. Tube 150 (and thus interior chamber 152 defined therein) extends circumferentially about variable geometry inlet 100 proximate retractable ring 110. In each of first mode 102 and second mode 104, tube 150 is radially disposed at least partially between variable geometry inlet inner surface 136 and variable geometry inlet outer surface 138. Tube 150 is generally configured to expand in response to a corresponding increase in pressure within chamber 152.

Figure 2:
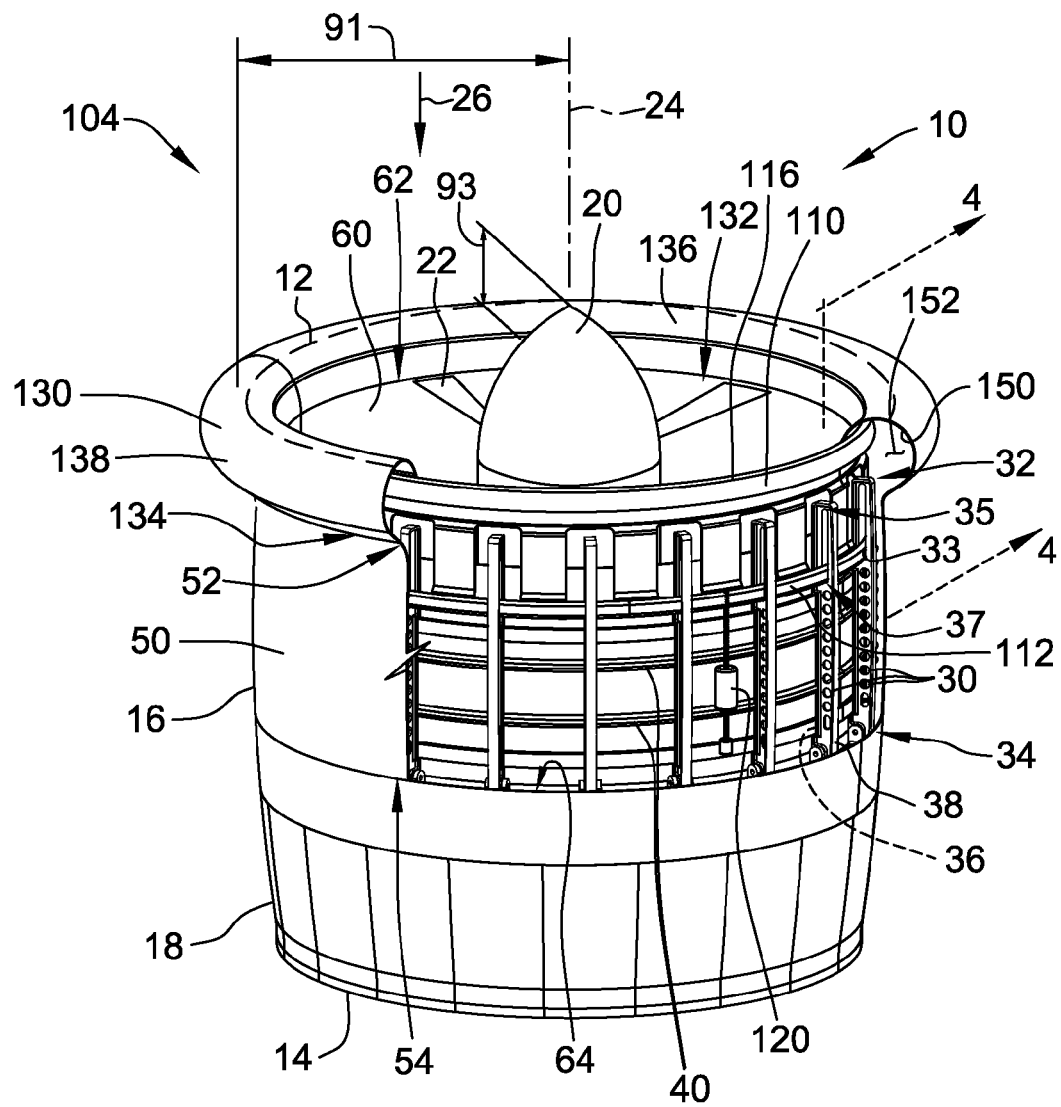
FIG. 2 is a schematic cutaway view of the exemplary ducted fan shown in FIG. 1 with the exemplary variable geometry inlet shown in FIG. 1 in a second operational mode.

Chamber 152 is at the first pressure in first mode 102 (shown in FIG. 1), and at the second pressure in second mode 104 (shown in FIG. 2). Moreover, the second pressure is greater than the first pressure, such that tube 150 is in a relatively deflated state in first mode 102 and in a relatively inflated state in second mode 104. In an embodiment, the first pressure is approximately equal to an ambient pressure in which ducted fan 10 operates. In an alternative embodiment, the first pressure is less than the ambient pressure in which ducted fan 10 operates. In other alternative embodiments, the first pressure is any suitable pressure that enables variable geometry inlet 100 to function as described herein. Chamber 152 is selectively pressurizable between the first pressure and the second pressure using any suitable system that enables variable geometry inlet 100 to function as described herein.

In first mode 102, with retractable ring 110 at the axially extended position, chamber 152 at the first pressure, and tube 150 in the relatively deflated state, stretchable skin 130 is disposed against forward edge 116 of retractable ring 110. More specifically, stretchable skin 130 disposed against forward edge 116 of retractable ring 110 defines leading edge 12 of variable geometry inlet 100 in first mode 102. In certain embodiments, stretchable skin 130 is coupled to body 16 in a sufficiently tensioned state to maintain a first desired aerodynamic shape as ducted fan 10 operates in first mode 102.

In second mode 104, with retractable ring 110 at the axially retracted position, chamber 152 at the second pressure, and tube 150 in the relatively inflated state, at least a portion of tube 150 extends axially upstream from forward edge 116 of retractable ring 110. More specifically, stretchable skin 130 disposed against the at least portion of tube 150 that extends axially upstream from forward edge 116 of retractable ring 110 defines leading edge 12 of variable geometry inlet 100 in second mode 104. In certain embodiments, stretchable skin 130 is coupled to body 16 in a sufficiently tensioned state to maintain a second desired aerodynamic shape as ducted fan 10 operates in second mode 104.

In certain embodiments, leading edge 12 of variable geometry inlet 100 is located at a different position, relative to center body 20 and at least one rotor 22, in first mode 102 as compared to second mode 104. For example, leading edge 12 is located at a first radial distance 90 from longitudinal axis 24 in first mode 102 (shown in FIG. 1), and at a second radial distance 91 from longitudinal axis 24 in second mode 104 (shown in FIG. 2), wherein second radial distance 91 differs from first radial distance 90. In the illustrated embodiment, second radial distance 91 is greater than first radial distance 90. In alternative embodiments, second radial distance 91 is less than or equal to first radial distance 90.

For another example, leading edge 12 is located at a first axial depth 92 relative to center body 20 in first mode 102 (shown in FIG. 1), and at a second axial depth 93 relative to center body 20 that differs from first axial depth 92 in second mode 104 (shown in FIG. 2). In the illustrated embodiment, second axial depth 93 is greater than first axial depth 92. In alternative embodiments, second axial depth 93 is less than or equal to first axial depth 92.

At least one of the difference in radial distances 90 and 91 and the difference in axial depths 92 and 93 causes a corresponding difference in a performance characteristic of ducted fan 10 between first mode 102 and second mode 104. For example, the difference in radial distances 90 and 91 results in a difference in a contraction ratio of ducted fan 10. In an embodiment, at least one of first radial distance 90 and first axial depth 92 are selected to facilitate an improved performance of ducted fan 10 in first mode 102, for example a cruise mode, and at least one of second radial distance 91 and second axial depth 93 are selected to facilitate an improved performance of ducted fan 10 in second mode 104, for example a hover mode.

As discussed above, stretchable skin 130 is formed from a material that is elastically deformable in at least a circumferential direction about longitudinal axis 24. In certain embodiments, stretchable skin 130 is formed from a one-dimensional stretchable material that is not substantially elastically deformable parallel to longitudinal axis 24. With particular reference to FIGS. 3 and 4, stretchable skin 130 defines a cross-sectional perimeter 154. More specifically, cross-sectional perimeter 154 is defined as a path along stretchable skin 130 from first edge 132 to second edge 134 in a plane that includes longitudinal axis 24, such as the cross-sectional plane shown in FIGS. 3 and 4. In embodiments where stretchable skin 130 is formed from a one-dimensional stretchable material, cross-sectional perimeter 154 maintains a substantially constant length as variable geometry inlet 100 moves selectively between first mode 102 and second mode 104. Thus, stretchable skin 130 formed from the one-dimensional stretchable material is in a sufficiently tensioned state relative to longitudinal axis 24 in each of first mode 102 and second mode 104 to maintain the corresponding first and second desired aerodynamic shape, and stretchable skin 130 stretches in the circumferential dimension to accommodate a circumferential expansion of tube 150 in second mode 104 relative to first mode 102.

In a particular embodiment, stretchable skin 130 is formed from a material that includes an elastic base material, such as but not limited to rubber, and also includes a plurality of circumferentially spaced embedded fibers (not shown) that each extend along stretchable skin 130 between first edge 132 and second edge 134 in a plane in which longitudinal axis 24 lies. The plurality of embedded fibers inhibits stretching of stretchable skin 130 parallel to longitudinal axis 24. In alternative embodiments, stretchable skin 130 is formed from any other suitable material that enables stretchable skin 130 to be substantially elastically deformable in a circumferential direction about longitudinal axis 24, but not substantially elastically deformable parallel to longitudinal axis 24. In other alternative embodiments, stretchable skin 130 is formed from a material that is substantially elastically deformable parallel to longitudinal axis 24.

In certain embodiments, the relatively deflated state of tube 150 in first mode 102 is an at least partially folded state. For example, in the illustrated embodiment, as shown in FIG. 3, tube 150 is formed such that it reversibly folds about a first crease 156 when tube 150 transitions from second mode 104 to first mode 102. First crease 156 facilitates ease of packing of tube 150 within variable geometry inlet 100 in first mode 102. In another embodiment, tube 150 is formed such that it reversibly folds about a plurality of creases (not shown) when tube 150 transitions from second mode 104 to first mode 102. In alternative embodiments, tube 150 is formed such that it does not reversibly fold about a crease when tube 150 transitions from second mode 104 to first mode 102.

Figure 5:
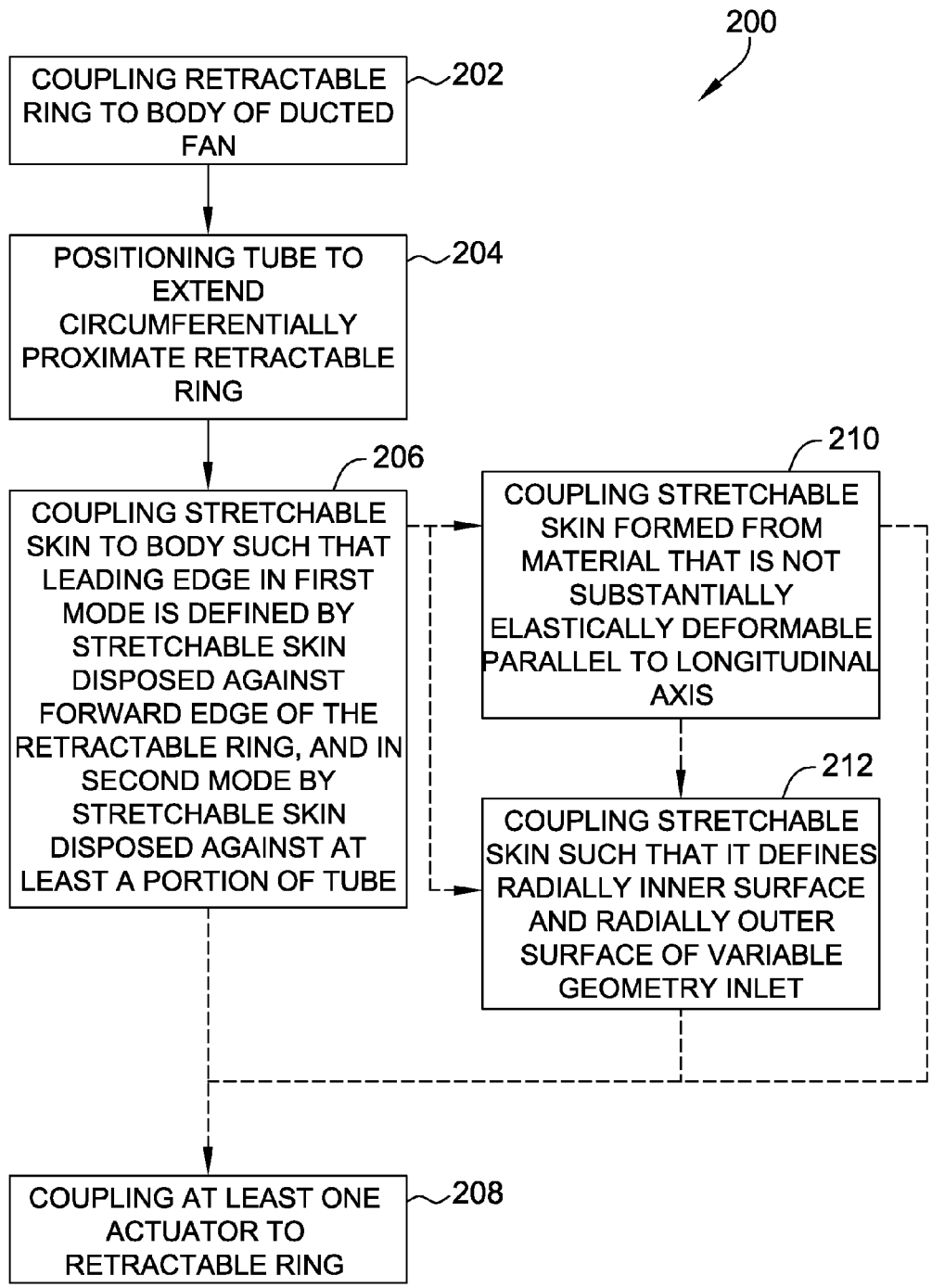
FIG. 5 is a flowchart of an embodiment of a method of assembling a ducted fan having a variable geometry inlet, such as the exemplary ducted fan and variable geometry inlet shown in FIG. 1.

FIG. 5 is a flowchart of an embodiment of a method 200 of assembling a ducted fan, such as ducted fan 10, having a variable geometry inlet, such as variable geometry inlet 100. With reference to FIGS. 1-5, the variable geometry inlet is selectively transitionable between a first mode, such as first mode 102, and a second mode, such as second mode 104. Method 200 includes coupling 202 a retractable ring, such as retractable ring 110, to a body of the ducted fan, such as body 16. The retractable ring extends circumferentially about the variable geometry inlet, and the retractable ring is selectively movable between an axially extended position in the first mode and an axially retracted position in the second mode. Method 200 also includes positioning 204 a tube, such as tube 150, to extend circumferentially proximate the retractable ring. The tube is pressurizable to a relatively deflated state in the first mode and to a relatively inflated state in the second mode. Method 200 further includes coupling 206 a stretchable skin, such as stretchable skin 130, to the body. The stretchable skin extends circumferentially proximate the retractable ring and is elastically deformable in at least a circumferential direction about a longitudinal axis, such as longitudinal axis 24, of the ducted fan. A leading edge, such as leading edge 12, of the variable geometry inlet in the first mode is defined by the stretchable skin disposed against a forward edge, such as forward edge 116, of the retractable ring, and the leading edge in the second mode is defined by the stretchable skin disposed against at least a portion of the tube.

In certain embodiments, method 200 includes one or more additional steps, which are linked by dashed lines in FIG. 5. For example, in certain embodiments, method 200 includes coupling 208 at least one actuator, such as at least one actuator 120, to the retractable ring. The at least one actuator is operable to selectively axially extend and retract the retractable ring. In certain embodiments, coupling 206 the stretchable skin to the body includes coupling 210 the stretchable skin formed from a material that is not substantially elastically deformable parallel to the longitudinal axis of the ducted fan. In certain embodiments, coupling 206 the stretchable skin to the body comprises coupling 212 the stretchable skin such that it defines a radially inner surface, such as radially inner surface 136, and a radially outer surface, such as radially outer surface 138, of the variable geometry inlet.

Each of the processes of method 200 may be performed or carried out by a system integrator, a third party, and/or a customer. For the purposes of this description, a system integrator may include without limitation any number of aircraft manufacturers and major-system subcontractors; a third party may include without limitation any number of venders, subcontractors, and suppliers; and a customer may be an airline, leasing company, military entity, service organization, and so on. Moreover, although an aerospace example is shown, the principles of the invention may be applied to other industries, such as the automotive industry.

The embodiments described herein provide a variable geometry inlet for a ducted fan. The embodiments provide a stretchable skin disposed against a forward edge of an axially extendable ring to define a leading edge of the variable geometry inlet in a first operational mode. The embodiments further provide the stretchable skin disposed against at least a portion of a pressurizable tube to define the leading edge of the variable geometry inlet in a second operational mode.

The embodiments described herein provide improvements over at least some ducted fan inlets. As compared to at least some known ducted fan inlets, the embodiments described herein facilitate enhanced performance of a ducted fan in two distinct operational modes, such as a cruise mode and a hover mode of a VTOL aircraft. In addition, the embodiments described herein are relatively non-complex both mechanically and for purposes of controllability. Thus, the embodiments described herein facilitate an increased reliability, cost effectiveness, and performance as compared to at least some known ducted fan inlets.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A variable geometry inlet for a ducted fan, said variable geometry inlet is selectively transitionable between a first mode and a second mode, said variable geometry inlet comprising:
   a retractable ring that extends circumferentially about said variable geometry inlet, said retractable ring is selectively movable between an axially extended position in the first mode and an axially retracted position in the second mode;
   a tube that extends circumferentially proximate said retractable ring, said tube is pressurizable to a relatively deflated state in the first mode and to a relatively inflated state in the second mode; and
   a stretchable skin that extends circumferentially proximate said retractable ring, said stretchable skin is elastically deformable in at least a circumferential direction about a longitudinal axis of the ducted fan, wherein a leading edge of said variable geometry inlet in the first mode is defined by said stretchable skin disposed against a forward edge of said retractable ring, and said leading edge in the second mode is defined by said stretchable skin disposed against at least a portion of said tube.

2. The variable geometry inlet according to claim 1, further comprising at least one actuator that is operable to selectively axially extend and retract said retractable ring.

3. The variable geometry inlet according to claim 2, further comprising:
   a track ring that is configured to be received in a plurality of slots defined in a plurality of stringers of the ducted fan; and
   a plurality of circumferentially spaced struts that each extend axially between said retractable ring and said track ring, wherein said at least one actuator is coupled to said track ring.

4. The variable geometry inlet according to claim 1, wherein said stretchable skin is formed from a material that is not substantially elastically deformable parallel to the longitudinal axis of the ducted fan.

5. The variable geometry inlet according to claim 4, wherein said material from which stretchable skin is formed comprises:
   an elastic base material; and
   a plurality of circumferentially spaced embedded fibers that each extend along said stretchable skin in a plane in which the longitudinal axis lies.

6. The variable geometry inlet according to claim 1, wherein said relatively deflated state of said tube is an at least partially folded state.

7. The variable geometry inlet according to claim 1, wherein said leading edge is located at a first radial distance from the longitudinal axis in the first mode, and at a second radial distance from the longitudinal axis in the second mode, wherein the second radial distance differs from the first radial distance.

8. The variable geometry inlet according to claim 1, wherein said stretchable skin defines a radially inner surface and a radially outer surface of said variable geometry inlet.

9. The ducted fan according to claim 1, wherein said stretchable skin is formed from a material that is not substantially elastically deformable parallel to said longitudinal axis of said ducted fan.

10. The ducted fan according to claim 9, wherein said material from which stretchable skin is formed comprises:
    an elastic base material; and
    a plurality of circumferentially spaced embedded fibers that each extend along said stretchable skin in a plane in which said longitudinal axis lies.

11. A ducted fan comprising:
    a generally annular body; and
    a variable geometry inlet coupled to said body, said variable geometry inlet is selectively transitionable between a first mode and a second mode, said variable geometry inlet comprises:
    a retractable ring that extends circumferentially about said variable geometry inlet, said retractable ring is selectively movable between an axially extended position in the first mode and an axially retracted position in the second mode;
    a tube that extends circumferentially proximate said retractable ring, said tube is pressurizable to a relatively deflated state in the first mode and to a relatively inflated state in the second mode; and
    a stretchable skin that extends circumferentially proximate said retractable ring, said stretchable skin is elastically deformable in at least a circumferential direction about a longitudinal axis of said ducted fan, wherein a leading edge of said variable geometry inlet in the first mode is defined by said stretchable skin disposed against a forward edge of said retractable ring, and said leading edge in the second mode is defined by said stretchable skin disposed against at least a portion of said tube.

12. The ducted fan according to claim 11, further comprising at least one actuator that is operable to selectively axially extend and retract said retractable ring.

13. The ducted fan according to claim 12, wherein said variable geometry inlet further comprises:
    a track ring that is configured to be received in a plurality of slots defined in a plurality of stringers of said body; and
    a plurality of circumferentially spaced struts that each extend axially between said retractable ring and said track ring, wherein said at least one actuator is coupled to said track ring.

14. The ducted fan according to claim 11, wherein said relatively deflated state of said tube is an at least partially folded state.

15. The ducted fan according to claim 11, wherein said leading edge is located at a first radial distance from said longitudinal axis in the first mode, and at a second radial distance from said longitudinal axis in the second mode, wherein the second radial distance differs from the first radial distance.

16. The ducted fan according to claim 11, wherein said stretchable skin defines a radially inner surface and a radially outer surface of said variable geometry inlet.

17. A method of assembling a ducted fan having a variable geometry inlet, wherein the variable geometry inlet is selectively transitionable between a first mode and a second mode, said method comprising:
    coupling a retractable ring to a body of the ducted fan, wherein the retractable ring extends circumferentially about the variable geometry inlet and is selectively movable between an axially extended position in the first mode and an axially retracted position in the second mode;
    positioning a tube to extend circumferentially proximate the retractable ring, wherein the tube is pressurizable to a relatively deflated state in the first mode and to a relatively inflated state in the second mode; and
    coupling a stretchable skin to the body, wherein the stretchable skin extends circumferentially proximate the retractable ring and is elastically deformable in at least a circumferential direction about a longitudinal axis of the ducted fan, such that a leading edge of the variable geometry inlet in the first mode is defined by the stretchable skin disposed against a forward edge of the retractable ring, and the leading edge in the second mode is defined by the stretchable skin disposed against at least a portion of the tube.

18. The method according to claim 17, further comprising coupling at least one actuator to the retractable ring, wherein the at least one actuator is operable to selectively axially extend and retract said retractable ring.

19. The method according to claim 17, wherein coupling the stretchable skin to the body comprises coupling the stretchable skin formed from a material that is not substantially elastically deformable parallel to the longitudinal axis.

20. The method according to claim 17, wherein coupling the stretchable skin to the body comprises coupling the stretchable skin such that it defines a radially inner surface and a radially outer surface of the variable geometry inlet.

* * * * *